United States Patent
Nabuchi et al.

(10) Patent No.: US 11,975,601 B2
(45) Date of Patent: May 7, 2024

(54) ELECTRIC VEHICLE FLOOR STRUCTURE

(71) Applicants: Nissan Motor Co., Ltd., Yokohama (JP); RENAULT S.A.S., Boulogne-Billancourt (FR)

(72) Inventors: Hiroaki Nabuchi, Kanagawa (JP); Hiroki Eida, Kanagawa (JP); Yuji Okamoto, Kanagawa (JP); Shinya Akizuki, Kanagawa (JP); Tatsuya Imashioya, Kanagawa (JP); Ryuki Maeta, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/996,510

(22) PCT Filed: Apr. 28, 2020

(86) PCT No.: PCT/IB2020/000408
§ 371 (c)(1),
(2) Date: Oct. 19, 2022

(87) PCT Pub. No.: WO2021/220027
PCT Pub. Date: Nov. 4, 2021

(65) Prior Publication Data
US 2023/0191886 A1    Jun. 22, 2023

(51) Int. Cl.
*B60K 1/04* (2019.01)
*B60K 1/00* (2006.01)

(52) U.S. Cl.
CPC .......... *B60K 1/04* (2013.01); *B60K 2001/005* (2013.01); *B60K 2001/0438* (2013.01)

(58) Field of Classification Search
CPC ...... B60K 2001/005; B60K 2001/0438; B60R 13/0861; B62D 35/02; B62D 25/2072
See application file for complete search history.

(56) References Cited

U.S. PATENT DOCUMENTS 7,614,469 B2 * 11/2009 Kumar ................ H01M 50/242
180/68.5
8,079,435 B2 * 12/2011 Takasaki ............. H01M 50/202
180/68.5
(Continued)

FOREIGN PATENT DOCUMENTS

CN    1378504 A  * 11/2002  ........... B29C 69/001
CN    1378504 A    11/2002
(Continued)

OTHER PUBLICATIONS

Chinese Office Action dated Oct. 19, 2023 of corresponding Chinese Patent Application No. 202080100346.2.

*Primary Examiner* — Katy M Ebner
(74) *Attorney, Agent, or Firm* — Global IP Counselors, LLP (57) ABSTRACT

A floor structure of an electric vehicle floor structure includes a battery unit and an underfloor panel. The battery unit is arranged underneath a floor of a passenger compartment between front wheels and rear wheels. The underfloor panel covers an entire bottom surface of the battery unit from below. The underfloor panel is provided with a center panel and a surrounding panel. The center panel has a noise absorption material that arranged at a lateral-direction center and a longitudinal-direction center of the underfloor panel. The surrounding panel has a high-strength material arranged around the center panel.

4 Claims, 4 Drawing Sheets

(56) References Cited

U.S. PATENT DOCUMENTS

| | | | | |
|---|---|---|---|---|
| 8,118,125 | B2* | 2/2012 | Suzuki | B60K 1/04 |
| | | | | 180/68.5 |
| 8,403,090 | B2* | 3/2013 | Fujiwara | H01M 50/224 |
| | | | | 429/96 |
| 8,875,828 | B2 | 11/2014 | Rawlinson et al. | |
| 9,281,505 | B2* | 3/2016 | Hihara | B62D 25/20 |
| 9,490,460 | B2* | 11/2016 | Yanagi | H01M 10/625 |
| 9,533,631 | B2* | 1/2017 | Kamimura | H01M 50/249 |
| 9,758,028 | B2* | 9/2017 | Ikeda | B62D 29/043 |
| 9,758,029 | B2* | 9/2017 | Hokazono | B60K 1/04 |
| 10,661,646 | B2* | 5/2020 | Matecki | H01M 50/244 |
| 10,720,680 | B2* | 7/2020 | Shen | H01M 50/204 |
| 11,088,412 | B2* | 8/2021 | Matecki | H01M 50/204 |
| 11,155,150 | B2* | 10/2021 | Stephens | B60K 11/02 |
| 11,637,346 | B2* | 4/2023 | Kaita | H01M 50/249 |
| | | | | 180/68.5 |
| 2012/0103714 | A1* | 5/2012 | Choi | B60K 1/04 |
| | | | | 180/68.5 |
| 2015/0135939 | A1* | 5/2015 | Rawlinson | F41H 5/04 |
| | | | | 89/36.08 |
| 2015/0336452 | A1* | 11/2015 | Decker | B62D 25/20 |
| | | | | 180/68.5 |
| 2016/0272246 | A1* | 9/2016 | Berger | H01M 50/24 |
| 2019/0009835 | A1* | 1/2019 | D'Amico | B32B 3/06 |
| 2019/0291785 | A1* | 9/2019 | Nagano | B62D 21/155 |
| 2019/0359047 | A1* | 11/2019 | Tsuyuzaki | B60K 1/04 |
| 2020/0001728 | A1* | 1/2020 | Spielvogel | H01M 10/647 |
| 2020/0307470 | A1* | 10/2020 | Uhl | B60R 13/0861 |
| 2021/0237550 | A1* | 8/2021 | Kawase | B60L 3/0007 |
| 2022/0080840 | A1* | 3/2022 | Kawase | B60R 16/0215 |
| 2022/0189446 | A1* | 6/2022 | Su | B60R 13/08 |
| 2022/0392281 | A1* | 12/2022 | Kellner | B60L 3/12 |
| 2022/0416356 | A1* | 12/2022 | Hauenstein | H01M 50/24 |

FOREIGN PATENT DOCUMENTS

| | | |
|---|---|---|
| CN | 202081977 U | 12/2011 |
| CN | 205202899 U | 5/2016 |
| CN | 109228839 A | 1/2019 |
| CN | 109515152 A | 3/2019 |
| DE | 102009057939 A1 | 6/2011 |
| JP | 2009-83598 A | 4/2009 |
| JP | 2013-71702 A | 4/2013 |
| JP | 5850689 B2 | 2/2016 |
| JP | 2017-115641 A | 6/2017 |
| JP | 2018-111354 A | 7/2018 |
| JP | 2019-503303 A | 2/2019 |
| JP | 2020-44963 A | 3/2020 |

* cited by examiner

ELECTRIC VEHICLE FLOOR STRUCTURE

CROSS-REFERENCE TO RELATED APPLICATIONS

This application is a U.S. national stage application of International Application No. PCT/IB2020/000408, filed on Apr. 28, 2020.

BACKGROUND

Technical Field

The present invention relates to a floor structure of an electric vehicle.

Background Information

Patent Document 1 indicated below discloses a floor structure of a battery electric vehicle (BEV). The floor structure is provided with a battery module that is arranged between front wheels and rear wheels underneath a floor of a passenger compartment, and an underfloor panel that is made of glass-fiber-reinforced plastic (GFRP) and that covers an entire bottom surface of the battery module from below. Japanese Laid-Open Patent Application No. 2009-83598 (Patent Document 1) discloses an undercover that makes it possible to avoid circumstances in which a curb or a bump in a road surface directly impacts a battery unit. Patent Document 1 also discloses that the undercover can prevent bolts for securing the battery unit to a vehicle body from falling. Furthermore, Patent Document 1 indicates that the undercover can reduce drag with respect to an airflow underneath the floor of the vehicle.

SUMMARY

In electric vehicles, although it is necessary to protect a battery unit as disclosed in Patent Document 1, it is also desirable to improve noise insulation properties. An amount of noise generated while the electric vehicle travels using a motor is lower than an amount of noise generated by a vehicle that travels using an internal combustion engine. Therefore, in an electric vehicle, when road noise generated between a road surface and tread surfaces of tires during travel reaches a passenger compartment from underneath a floor as air-propagated noise, this road noise will be recognized by a passenger as noise more readily than in the case of an internal combustion engine vehicle (ICE vehicle). Noise generated when gravel, etc., that is thrown up by the tires hits an underside of the floor will also be recognized by a passenger as noise more readily than in the case of an ICE vehicle. Therefore, there is greater demand for noise insulation properties in electric vehicles than in ICE vehicles.

It is therefore an object of the present invention to provide a floor structure of an electric vehicle, the floor structure making it possible to improve noise insulation properties of an underside of a floor and to reliably protect a battery unit disposed underneath the floor.

An electric vehicle floor structure of an electric vehicle according to an aspect of the present invention comprises a battery unit arranged between front wheels and rear wheels underneath a floor of a passenger compartment, and an underfloor panel that covers an entire bottom surface of the battery unit from below. The underfloor panel is provided with a center panel comprising a noise absorption material and arranged at a lateral-direction center and a longitudinal-direction center of the electric vehicle, and a surrounding panel comprising a high-strength material and arranged around the center panel.

According to the aforementioned aspect of the present invention, it is possible to improve noise insulation properties through noise absorption achieved by the center panel and noise shielding achieved by the surrounding panel, and to reliably protect the battery unit using the underfloor panel.

BRIEF DESCRIPTION OF THE DRAWINGS

Referring now to the attached drawings which form a part of this original disclosure.

DETAILED DESCRIPTION OF EMBODIMENTS

A floor structure of an electric vehicle according to an embodiment is described below with reference to FIGS. 1 to 4.

The electric vehicle according to the present embodiment is a battery electric vehicle (BEV) in which electric power stored in a battery unit 1 is consumed and four wheels (front wheels FW and rear wheels RW) are driven using two motors (not shown) that are mounted at each of a front section and a rear section of the BEV, without an internal combustion engine being mounted in the BEV. When the vehicle is decelerating, the motors generate electric power in a regenerative manner, and the battery unit 1 is charged by the electric power thus generated. The battery unit 1 is also charged by electric power supplied from outside of the vehicle.

A cruising distance of the BEV is determined according to the electric power stored in the battery unit 1 (and the electric power that is generated in a regenerative manner). Thus, there is a demand for a battery unit 1 having a greater charging capacity to be mounted in the BEV. As the charging capacity increases, a volume of the battery unit 1 also increases. Therefore, the battery unit 1 in the BEV is mounted in the vehicle so as to occupy an entire underside of a floor of a passenger compartment. More specifically, the battery unit 1 is mounted between the front wheels FW and the rear wheels RW (between a front wheelhouse and a rear wheelhouse), and also between a pair of side sills 2.

In plan view, the battery unit 1 occupies a range between a rear end of the front wheels FW (front wheelhouse) and a front end of the rear wheels RW (rear wheelhouse), and moreover between the pair of side sills 2. Because the battery unit 1 has a high weight per unit volume, having the battery unit 1 be mounted at such a position lowers a position of a center of gravity of the vehicle and improves drive performance of the vehicle.

The battery unit 1 has a case 1c made of an aluminum alloy. Numerous battery modules 1m in which a plurality of battery cells are incorporated are mounted inside the case 1c. Peripheral devices relevant to charging and discharging of the battery modules 1m are also incorporated inside the case 1c. Additionally, a beam member 1s that ensures strength and rigidity in the case 1c and that supports the battery modules 1m is attached inside the case 1c. A bottom of the case 1c is closed off by a plurality of bottom panels 1p.

The bottom panels 1p are formed using an extruded aluminum member and are configured such that a cross-sectional shape thereof that is perpendicular to a longitudinal direction of the vehicle (left-right direction in FIG. 3) does not change. The bottom panels 1p have a length equal to a longitudinal length of the battery unit 1. The bottom panels 1p are attached to the case 1c while lined up in parallel in a lateral direction of the vehicle (left-right direction in FIG. 4).

Each of the bottom panels 1p is provided with a double-bottom structure comprises a top plate 1t and a bottom plate 1b. Specifically, the double-bottom structure is provided at a bottom of the battery unit 1. A coolant circulation pipe 1f is provided inside the double-bottom structure. Because the bottom panels 1p are formed using an extruded aluminum member as indicated above, the coolant circulation pipe 1f is formed integrally with the top plate 1t. Additionally, a horizontal width of the coolant circulation pipe 1f increases with increasing proximity to the top plate 1t. Therefore, coolant flowing through an interior of the coolant circulation pipe 1f can efficiently absorb heat from the battery modules 1m, which are lined up on the top plate 1t.

Employing such a configuration for the coolant circulation pipes 1f imparts strength and rigidity to the coolant circulation pipes 1f while also imparting strength and rigidity to the bottom panels 1p. Furthermore, a clearance is formed between the coolant circulation pipes 1f and the bottom plates 1b. Therefore, the coolant circulation pipes 1f can be protected even if the bottom panels 1p receive a shock from below and deform due to a curb, a bump in a road surface, etc., provided that the bottom plates 1b do not come into contact with the coolant circulation pipes 1f. Moreover, because the strength and rigidity of the coolant circulation pipes 1f are improved due to the aforementioned shape of the coolant circulation pipes 1f, it is possible to avoid the coolant circulation pipes 1f breaking even if the bottom plates 1b come into contact with the coolant circulation pipes 1f. Furthermore, the double-bottom structure of the bottom panels 1p also functions as a noise shielding structure that prevents transmission of noise from underneath the floor into the passenger compartment.

Furthermore, vertical walls 1w that link the top plate 1t and the bottom plate 1b are also provided integrally inside each double-bottom structure. In the present embodiment, three coolant circulation pipes 1f and three vertical walls 1w are provided to one bottom panel 1p. The vertical walls 1w also impart strength and rigidity to the bottom panel 1p and prevent contact between the bottom plate 1b and the coolant circulation pipes 1f caused by a shock from below. A plastic or metal connecting pipe (not shown) is attached to a longitudinal end section of each of the coolant circulation pipes 1f, the connecting pipes connecting the longitudinal end sections to end sections of other coolant circulation pipes 1f so as to form a circulation path for the coolant using all of the coolant circulation pipes 1f. Specifically, a plurality of connecting pipes are disposed at a front end and a rear end of the bottom of the battery unit 1.

Figure 1:
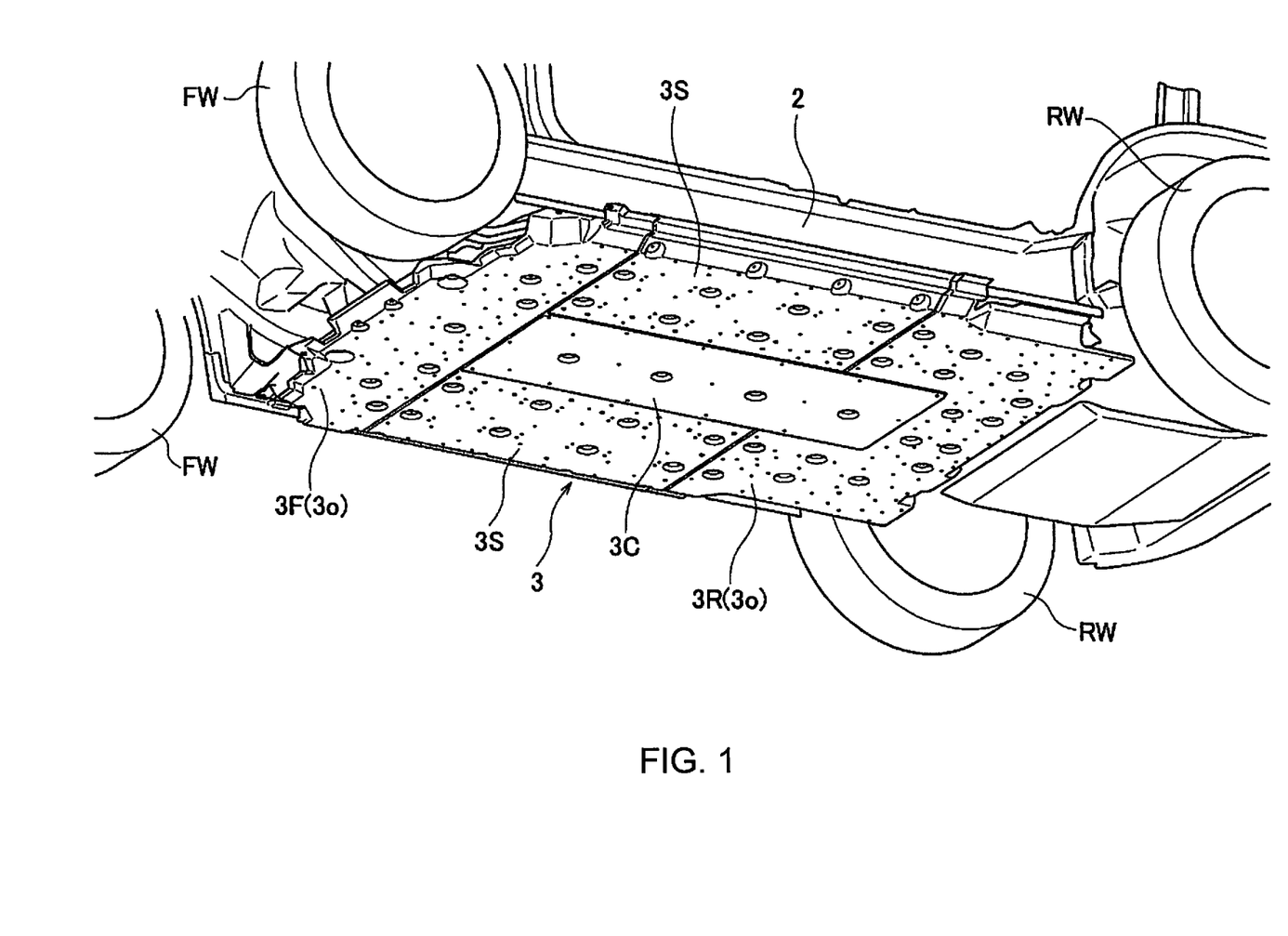
FIG. 1 is a perspective view in which a floor structure according to an embodiment is viewed from below.
Figure 2:
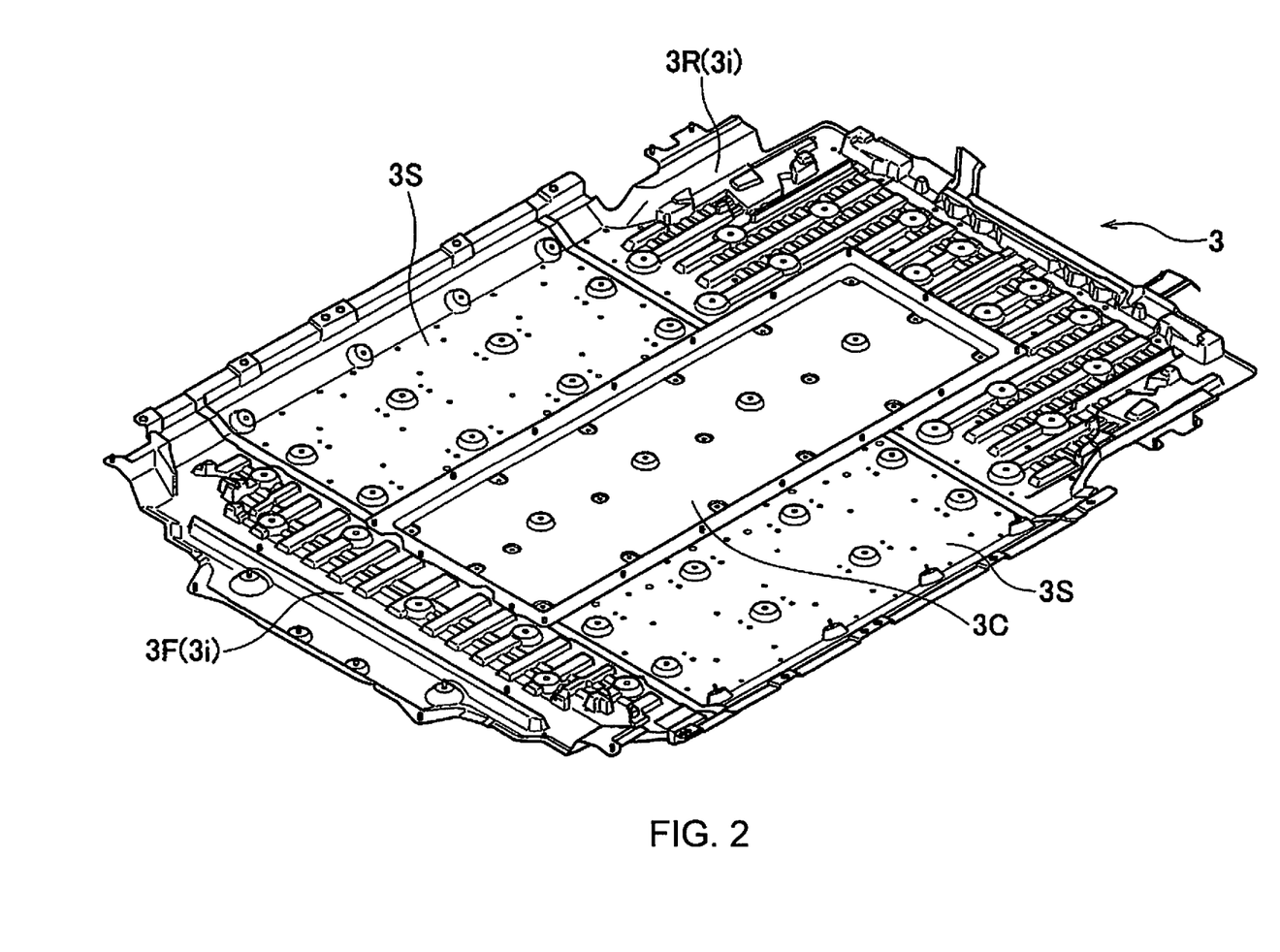
FIG. 2 is a perspective view in which an underfloor panel of the floor structure is viewed from above.
Figure 3:
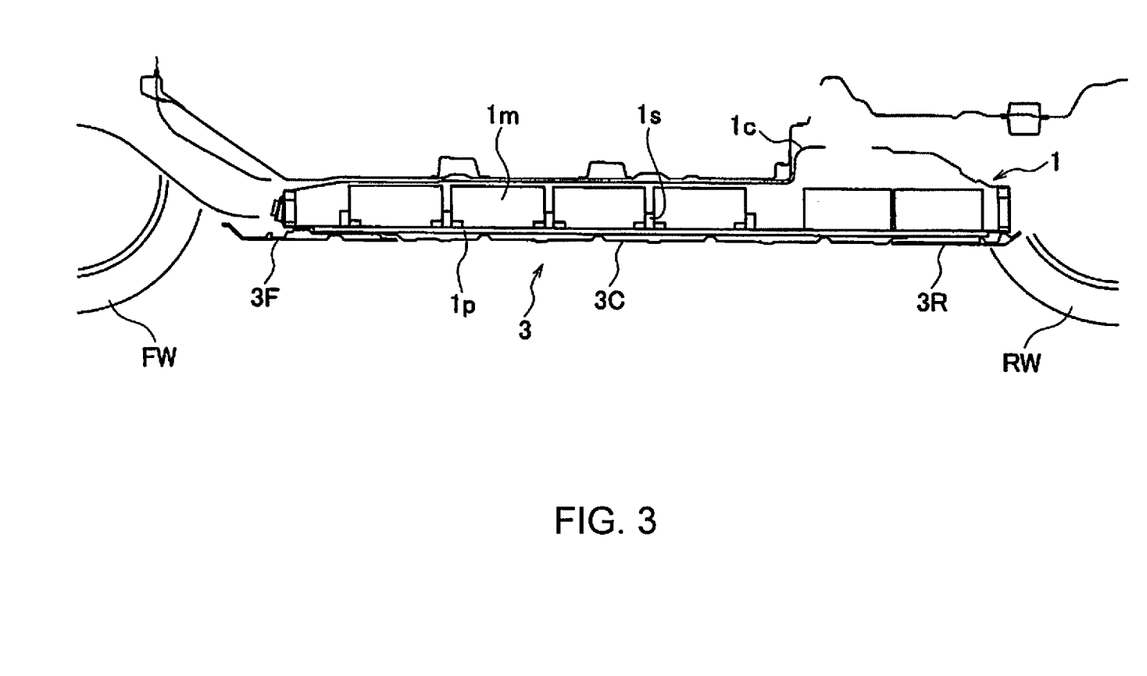
FIG. 3 is a lateral cross-sectional view of the floor structure.
Figure 4:
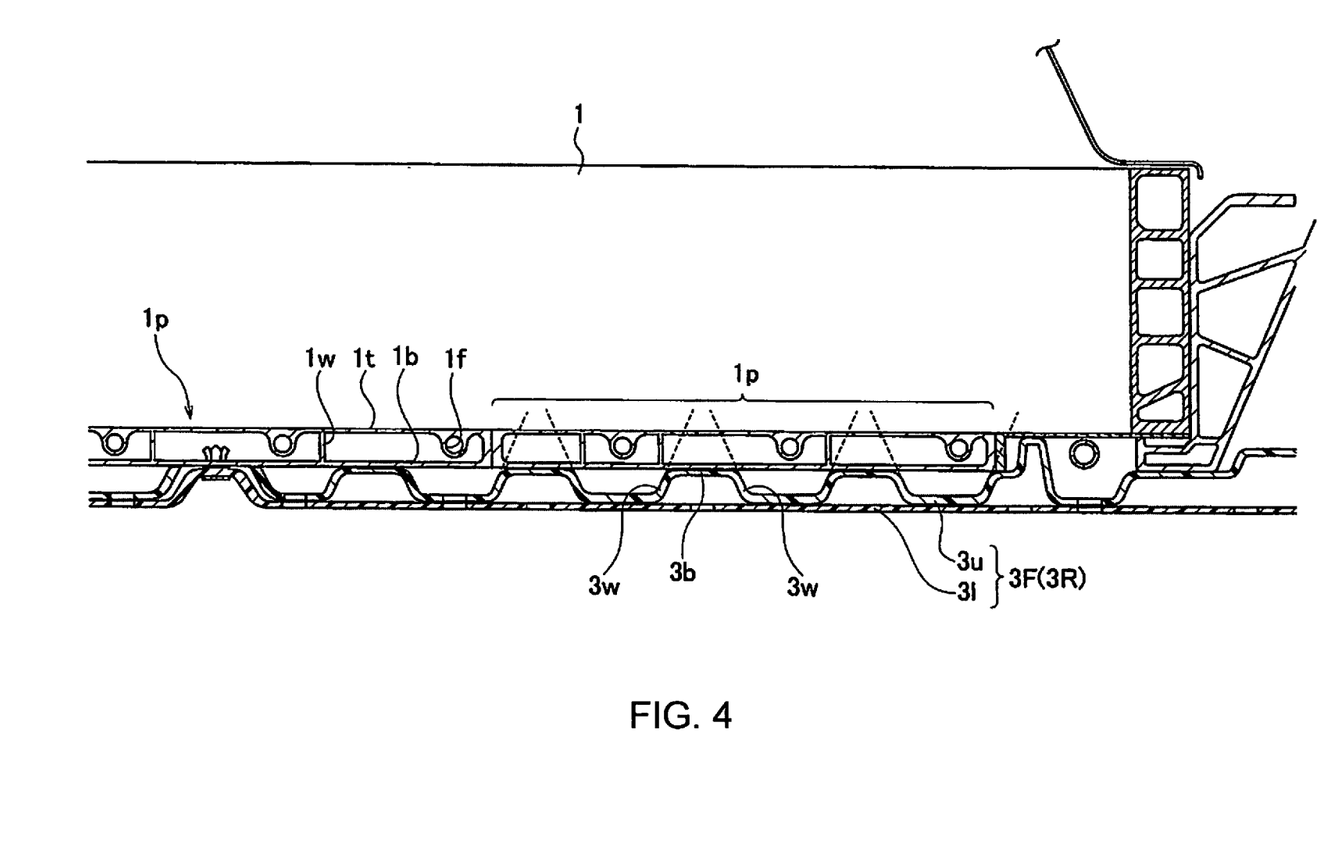
FIG. 4 is an enlarged cross-sectional view of the floor structure.

The coolant circulation pipes 1f of the plurality of bottom panels 1p are lined up in the lateral direction at fixed intervals (refer to FIG. 4). The coolant circulation pipes 1f, and a positional relationship between the vertical walls 1w and an underfloor panel 3 that shall be described later, are described in greater detail below. The battery unit 1 according to the present embodiment is attached to a vehicle body from below and is not supported from below. Therefore, it is important to improve strength and rigidity in a floor part (bottom panels 1p) of the battery unit 1, which supports numerous heavy battery modules 1m from below. Additionally, as indicated above, improving the strength and rigidity of the floor part (bottom panels 1p) of the battery unit 1 is also important in protecting the battery modules 1m from a shock from below.

Furthermore, in the present embodiment, the underfloor panel 3, which covers an entire bottom surface of the battery unit 1 from below, is provided mainly as a noise insulation member. The underfloor panel 3 is attached to the bottom surface (bottom plates 1b of the bottom panels 1p) of the battery unit 1 using plastic clips. The underfloor panel 3 also functions as a member for protecting the battery unit 1 and as an aerodynamic member that reduces drag with respect to an airflow underneath the floor of the vehicle. The underfloor panel 3 comprises a felt center panel 3C that is arranged centrally in terms of both the lateral direction and the longitudinal direction, and a fiber-reinforced plastic (FRP) surrounding panel (3F, 3R, 3S) arranged around the center panel 3C.

In the present embodiment, the fiber in the FRP constituting the surrounding panel (3F, 3R, 3S) is glass fiber, and the matrix resin in the FRP is polypropylene (PP). The surrounding panel (3F, 3R, 3S) further comprises a front panel 3F disposed frontward of the center panel 3C, a rear panel 3R disposed rearward of the center panel 3C, and side panels 3S disposed on each of two sides of the center panel 3C. The front panel 3F, rear panel 3R, and side panels 3S are injection-molded. The center panel 3C, which is formed from water-resistant felt, is molded by pressing felt (while applying heat as needed).

The felt center panel 3C, which has numerous very small gaps in the interior thereof, functions mainly as a noise absorption member. Even 1f gravel, etc., that is thrown up by the vehicle wheels hits the center panel 3C, the felt center panel 3C serves as a cushion and reduces generation of noise. By contrast, the front panel 3F, rear panel 3R, and side panels 3S (the FRP surrounding panel) function mainly as noise shielding members. The side panels 3S are a pair of plates, and each of the front panel 3F and the rear panel 3R has a double-panel structure comprising an inside panel 3i and an outside panel 3o (refer to FIG. 4). The inside panel 3i and outside panel 3o are each injection-molded and then integrated using an adhesive agent.

A plurality of beads 3b are formed within a range of a majority portion (at least part) of each of the inside panels 3i in order to impart strength and rigidity to the front panel 3F and rear panel 3R. The beads 3b are caused to bulge toward an opposite side to the outside panel 3o and extend in the longitudinal direction. Therefore, the inside panel 3i is formed in a corrugated shape due to the plurality of beads 3b. Additionally, low-height beads are formed in the lateral direction between adjacent beads 3b in order to improve strength and rigidity. Due to the beads 3b, a gap is formed between the inside panel 3i and the outside panel 3o (and between the inside panel 3i and the bottom panel 1p). Noise shielding properties in a double-panel (double-wall) structure in which a gap is provided between two panels are superior to noise shielding properties in a structure in which two panels are in complete surface contact.

A bottom surface of the outside panel 3o is formed essentially flat, the bottom surface reducing drag with respect to an airflow underneath the floor of the vehicle. However, dimples are formed at positions on the outside panel 3o at which the aforementioned plastic clips are attached. Dimple holes are formed at plastic clip attachment positions on the inside panel 3i as well. End edges of the mutually bonded inside panel 3*i* and outside panel 3*o* (i.e., the front panel 3F and rear panel 3R) are caused to overlap end edges of the center panel 3C and side panels 3S and are attached to the bottom plates 1*b* of the bottom panels 1*p* via the dimples on the outside panel 3*o*.

Due to having a double-panel structure, the front panel 3F and rear panel 3R have exceptional noise shielding performance for blocking air-propagated noise propagating from outside the vehicle into the passenger compartment. The front panel 3F and rear panel 3R are also disposed near the vehicle wheels (front wheels FW and rear wheels RW). Gravel or rainwater thrown up by the vehicle wheels forcefully hits the underfloor panel 3 and generates noise, but what the gravel mainly hits is the front panel 3F and rear panel 3R. When this occurs, because the front panel 3F and rear panel 3R have the double-panel structure having a high noise shielding effect, such noise does not readily propagate into the passenger compartment.

As described above, the underfloor panel 3 functions both as a noise insulation member and as a member for protecting the battery unit 1. When impacting the bottom of the vehicle, a curb, a bump in a road surface, etc., impacts the underfloor panel 3 before impacting the bottom panels 1*p* of the battery unit 1, and the underfloor panel 3 protects the battery unit 1 (bottom panels 1*p*). As described above, the bottom panels 1*p* also have a structure for protecting against impact, but the bottom panels 1*p* are more reliably protected by the underfloor panel 3.

A shock to the bottom of the vehicle occurs in association with a suspension stroke immediately after the vehicle wheels have passed over a bump in a road surface (or run up onto a curb). Alternatively, a shock to the bottom of the vehicle occurs in association with a suspension stroke immediately after the vehicle wheels have fallen into a recess in a road surface (or descended from the curb). Such interference with, inter alia, a bump in a road surface can arise both when the vehicle is advancing and when the vehicle is moving in reverse. Therefore, the shock is transmitted within a range immediately rearward of the front wheels FW or within a range immediately forward of the rear wheels RW. In the present embodiment, the front panel 3F and rear panel 3R having the double-panel structure are disposed at positions within these ranges. Therefore, according to the present embodiment, the battery unit 1 (particularly the coolant circulation pipes 3 provided at the bottom of the battery unit 1) can be more reliably protected.

As described above, the plurality of connecting pipes that connect the coolant circulation pipes 1*f* are disposed at the front and rear ends of the bottom of the battery unit 1. Because the front panel 3F and rear panel 3R also cover the connecting pipes from below, the connecting pipes can also be protected. Moreover, because the connecting pipes are provided outside of the double-bottom structure of the bottom panels 1*p*, it is important to protect the connecting pipes using the front panel 3F and rear panel 3R.

In cases where, inter alia, the vehicle runs off a road shoulder simultaneously at the front wheel FW and rear wheel RW on one side of the vehicle, the side panels 3S can come into contact with the road surface. Therefore, providing the side panels 3S within ranges that are near side surfaces of the vehicle while still being at a center between the front wheels FW and the rear wheels RW makes it possible to protect the battery unit 1 (bottom panels 1*p*). Bottom surfaces of the side panels 3S are also formed essentially flat, the bottom surfaces reducing drag with respect to an airflow underneath the floor of the vehicle. Dimples are also formed at plastic clip attachment positions on the side panels 3S, and the side panels 3S are attached to the bottom plates 1*b* of the bottom panels 1*p* via the dimples. Because the side panels 3S are less likely to come into contact with, inter alia, a bump in a road surface than are the front panel 3F and rear panel 3R, each of the side panels 3S is configured as a single glass-fiber-reinforced plastic (GFRP) panel. However, ribs are formed on inner surfaces (upper surfaces) of the side panels 3S such that the dimples are linked in order to improve the strength and rigidity of the side panels 3S (refer to FIG. 2).

There is little likelihood of contact being made with, inter alia, a bump in a road surface at the center between the front wheels FW and rear wheels RW and at a lateral-direction center. Therefore, the water-resistant-felt center panel 3C is arranged at this portion as a noise absorption member to emphasize noise insulation properties. A bottom surface of the center panel 3C is also formed essentially flat, the bottom surface reducing drag with respect to an airflow underneath the floor of the vehicle. Dimples are also formed at plastic clip attachment positions on the center panel 3C, and the center panel 3C is attached to the bottom plates 1*b* of the bottom panels 1*p* via the dimples and peripheral edges of the center panel 3C. The plastic clips at the peripheral edges are covered by the front panel 3F, rear panel 3R, and side panels 3S. Through-holes for discharging water are formed in the center panel 3C, front panel 3F, rear panel 3R, and side panels 3S.

As described above, when, inter alia, a bump in a road surface impacts the bottom of the vehicle, a shock can be transmitted to the battery unit 1 (bottom panels 1*p*) via the underfloor panel 3. In the present embodiment, a positional relationship between the front panel 3F (rear panel 3R) and the bottom panels 1*p* is set such that a shock to the battery unit 1 (bottom panels 1*p*) is mitigated even in such cases.

A load inputted to the outside panel 3*o* of the front panel 3F (or rear panel 3R) is inputted to the inside panel 3*i* and then is inputted to the bottom panels 1*p* via the upper surfaces of the beads 3*b*. Thus, in the present embodiment, the longitudinally extending beads 3*b* do not overlap the longitudinally extending coolant circulation pipes 1*f* in plan view (or in bottom view), as shown in FIG. 4. Due to this structure, contact between the bottom plates 1*b* of the bottom panels 1*p* and the coolant circulation pipes 1*f* is avoided even if the bottom plates 1*b* deform upward due to input of a load from the beads 3*b*. As a result, it is possible to avoid breakage of the coolant circulation pipes 1*f*, i.e., breakage of a coolant system of the battery unit 1.

As described above, the vertical walls 1*w* are also provided inside the double-panel structure of the bottom panels 1*p* in order to prevent the bottom plates 1*b* from deforming upward. In the present embodiment, the beads 3*b* are disposed such that extension surfaces of longitudinally extending raised side walls 3*w* thereof do not intersect the vertical walls 1*w*, as shown in FIG. 4. Input of a load from the beads 3*b* to the bottom plates 1*b* is particularly inputted along the raised side walls 3*w* of the beads 3*b*. Thus, the beads 3*b* are disposed such that the aforementioned extension surfaces do not intersect the vertical walls 1*w* so that loads from the beads 3*b* are not inputted directly to the vertical walls 1*w*.

If the extension surfaces were to intersect the vertical walls 1*w*, loads would be inputted directly to the vertical walls 1*w* and there would be a risk of the vertical walls 1*w* buckling. In such a case, deformation of the bottom plates 1*b* could not be effectively prevented. Additionally, even if the vertical walls 1*w* did not buckle upon loads being inputted directly thereto, forces that raise the entirety of the bottom plates 1*b* would act and affect the battery modules 1*m*, which are lined up in an orderly manner inside the battery unit 1. Thus, disposing the beads 3b such that the aforementioned extension surfaces do not intersect the vertical walls 1w makes it possible to avoid damage to the battery unit 1.

In the embodiment described above, the underfloor panel 3 that covers the entire bottom surface of the battery unit 1 is provided with: the center panel 3C, which comprises a noise absorption material (felt) and arranged centrally; and the surrounding panel (3F, 3R, 3S), which comprises of a high-strength material (FRP) and arranged around the center panel 3C. The center panel 3C, which comprises the noise absorption material, absorbs noise propagating from underneath the floor outside the vehicle into the passenger compartment and reduces noise within the vehicle. The surrounding panel (3F, 3R, 3S), which comprises the high-strength material and arranged around the center panel 3C, and which could possibly interfere with, inter alia, a bump in a road surface, functions as a noise shielding member, preventing transmission of noise from underneath the floor outside the vehicle into the passenger compartment and reducing noise within the vehicle. Provided that this member has high strength, the surrounding panel (3F, 3R, 3S) can function as a noise shielding member that prevents transmission of noise. Additionally, even if the surrounding panel (3F, 3R, 3S) interferes with, inter alia, a bump in a road surface, the surrounding panel (3F, 3R, 3S) is not readily damaged due to the high-strength material that protects the battery unit 1. As shall be apparent, the entire underfloor panel 3 can reduce drag with respect to an airflow underneath the floor of the vehicle.

In the present embodiment, the noise absorption member forming the center panel 3C is made of felt. Provided that this member is made of felt, the felt center panel 3C can serve as a cushion and reduce generation of noise even if gravel, etc., that is thrown up by the vehicle wheels hits the center panel 3C. However, while felt is preferred for the noise absorption member forming the center panel 3C, the noise absorption member is not limited to being made of felt. The noise absorption member is preferably formed from a porous material having numerous very small gaps in the interior thereof, and the center panel 3C can be an injection-molded member in which a foamed resin is used. Additionally, in the present embodiment, the high-strength member forming the surrounding panel (3F, 3R, 3S) is made of GFRP. While FRPs such as GFRP or carbon-fiber-reinforced plastic (CFRP) are preferred for the high-strength member forming the surrounding panel (3F, 3R, 3S), the high-strength member is not limited to being made of FRP. The high-strength member, which also functions as a noise shielding member, is preferably a resin composite member in consideration of moldability and reduced weight. For example, the surrounding panel (3F, 3R, 3S) can be an injection-molded resin member into which a metal mesh has been inserted. The surrounding panel (3F, 3R, 3S) can also be formed using mutually different materials, provided that the surrounding panel (3F, 3R, 3S) is formed from high-strength members.

The surrounding panel (3F, 3R, 3S) is provided with the front panel 3F, the rear panel 3R, and the pair of side panels 3S, and each of the front panel 3F and the rear panel 3R has a double-panel structure. Due to having a double-panel structure, the front panel 3F and rear panel 3R have exceptional noise shielding properties. Because gravel, etc., that is thrown up by the vehicle wheels readily hits the front panel 3F and rear panel 3R arranged near the vehicle wheels, the exceptional noise shielding properties of the front panel 3F and rear panel 3R are effective for reducing noise from such sources. Interference with, inter alia, a bump in a road surface also readily occurs near the vehicle wheels. Therefore, because the double-panel structure (inside panels 3i and outside panels 3o) of the front panel 3F and rear panel 3R improve the strength and rigidity thereof, it is possible to effectively prevent damage to the front panel 3F and rear panel 3R. As a result, it is possible to reliably protect the battery unit 1.

Furthermore, at least part of the inside panels 3i is formed in a corrugated shape due to the beads 3b, and the bottom surfaces of the outside panels 3o are formed flat. Therefore, the strength and rigidity of the front panel 3F and rear panel 3R are further improved due to the inside panels 3i on which the beads 3b are formed. Additionally, because a gap is formed between the outside panels 3o and the battery unit 1 (bottom panels 1p) due to the shapes of the beads 3b, the gap further improves noise insulation properties. Moreover, because the bottom surfaces of the outside panels 3o are flat, it is possible to effectively reduce drag with respect to an airflow underneath the floor of the vehicle. Additionally, because the beads 3b are disposed so as not to overlap the coolant circulation pipes 1f of the battery unit 1 in plan view, it is possible to avoid circumstances in which a load that is applied to the bottom surface of the battery unit 1 from the beads 3b and that is caused by interference with, inter alia, a bump in a road surface acts on the coolant circulation pipes 1f. As a result, it is possible to avoid breakage of the coolant circulation pipes 1f, i.e., breakage of the coolant system of the battery unit 1.

Furthermore, the coolant circulation pipes 1f are arranged inside the double-bottom structure (top plate 1t and bottom plate 1b) provided to the bottom of the battery unit 1. The double-bottom structure even further reduces noise propagating from underneath the floor outside the vehicle into the passenger compartment. The vertical walls 1w are also provided inside the double-bottom structure, and the extension surfaces of the raised side walls 3w of the beads 3b do not intersect the vertical walls 1w. The aforementioned load that is applied to the bottom surface (the bottom plates 1b of the bottom panels 1p) of the battery unit 1 from the beads 3b and that is caused by interference with, inter alia, a bump in a road surface is inputted along the raised side walls 3w of the beads 3b. Because the extension surfaces of the raised side walls 3w and the vertical walls 1w do not intersect, it is possible to avoid circumstances in which the load is inputted directly to the vertical walls 1w and to prevent buckling of the vertical walls 1w. Therefore, damage to the battery unit 1 (particularly the coolant circulation pipes 1f) can be even further avoided.

The present invention is not limited to the embodiment described above. For example, the electric vehicle in the embodiment described above is a BEV, but may instead be a hybrid electric vehicle (HEV, including PHEVs). In the case of a HEV in which an exhaust pipe of an internal combustion engine mounted in a front section of the vehicle is installed underneath the floor, it is thought that the aforementioned layout of the battery unit 1 and the underfloor panel 3 is not established. However, the aforementioned layout of the battery unit 1 and the underfloor panel 3 can be established in a HEV in which a small internal combustion engine serving as a range extender is installed in a rear section of the vehicle.

The invention claimed is:
1. An electric vehicle floor structure comprising:
   a battery unit arranged underneath a floor of a passenger compartment between front wheels and rear wheels; and an underfloor panel covering an entire bottom surface of the battery unit from below, the underfloor panel being provided with a center panel having a noise absorption material arranged centrally in both a lateral direction and a longitudinal direction of the underfloor panel, and a surrounding panel having a high-strength material arranged laterally around the center panel, and the surrounding panel including a front panel disposed frontward of the center panel, a rear panel disposed rearward of the center panel, and side panels disposed on opposite sides of the center panel, each of the front panel, the rear panel, the side panels and the center panel being separately formed.

2. The electric vehicle floor structure according to claim 1, wherein each of the front panel and the rear panel has a double-panel structure comprises an inside panel and an outside panel.

3. The electric vehicle floor structure according to claim 2, wherein at least part of the inside panels is formed in a corrugated shape due to beads that bulge toward an opposite side of the outside panel extending in the longitudinal direction, and bottom surfaces of the outside panels are formed flat;

the battery unit is provided with a coolant circulation pipe extending in the longitudinal direction at a bottom of the battery unit; and the beads are disposed so as not to overlap the coolant circulation pipe in plan view.

4. The electric vehicle floor structure according to claim 3, wherein the coolant circulation pipe is arranged inside a double-bottom structure provided to the bottom of the battery unit, vertical walls extending in the longitudinal direction are provided inside the double-bottom structure, and the beads are disposed such that virtual extension surfaces of longitudinally extending side walls of the beads do not intersect the vertical walls.

\* \* \* \* \*